US012555967B2

(12) United States Patent
Zhang

(10) Patent No.: US 12,555,967 B2
(45) Date of Patent: Feb. 17, 2026

(54) WIRE CRIMPER WITH REPLACEABLE JAW

(71) Applicant: Shenzhen Duomidao Plastic Hardware Products Co., Ltd., Shenzhen (CN)

(72) Inventor: Qifei Zhang, Shangrao (CN)

(73) Assignee: Shenzhen Duomidao Plastic Hardware Products Co., Ltd., Shenzhen (CN)

( * ) Notice: Subject to any disclaimer, the term of this patent is extended or adjusted under 35 U.S.C. 154(b) by 0 days.

(21) Appl. No.: 19/217,223

(22) Filed: May 23, 2025

(65) Prior Publication Data

US 2025/0286335 A1 Sep. 11, 2025

(30) Foreign Application Priority Data

Jun. 5, 2024 (CN) ......................... 202421276150.0

(51) Int. Cl.
*H01R 43/042* (2006.01)

(52) U.S. Cl.
CPC .................................. *H01R 43/042* (2013.01)

(58) Field of Classification Search
CPC .. B25B 27/146; H01R 43/0424; H01R 43/042
USPC ........... 30/90.1, 90.2, 91.2; 7/128, 125, 107; 81/423; 72/409.16
See application file for complete search history.

(56) References Cited

U.S. PATENT DOCUMENTS

| | | | | |
|---|---|---|---|---|
| 2007/0283740 | A1* | 12/2007 | Li | B25B 27/146 72/409.16 |
| 2008/0072716 | A1* | 3/2008 | Chen | B25B 7/00 81/415 |
| 2008/0098791 | A1 | 5/2008 | Clark et al. | |
| 2012/0216399 | A1 | 8/2012 | Kawell et al. | |
| 2023/0150012 | A1 | 5/2023 | Ritter | |

* cited by examiner

*Primary Examiner* — Tom Rodgers
(74) *Attorney, Agent, or Firm* — Hemisphere Law, PLLC

(57) ABSTRACT

Disclosed is a wire crimper with a replaceable jaw, including a wire crimper body and a jaw. The wire crimper body has an end provided with a handle as well as an end being a clamping end. A recess is formed in an opening of the clamping end, at least one elastic piece is mounted at an inner end of the recess, the jaw is inserted into the recess, a spindle is arranged in the recess, an end of the spindle is provided with a turncap and located outside the clamping end, a socket is formed in the jaw, a circular hole is formed in a bottom of the socket, and a locking piece shaped like an elliptic cylinder is arranged at a position, corresponding to the socket, of the spindle.

3 Claims, 4 Drawing Sheets

WIRE CRIMPER WITH REPLACEABLE JAW

BACKGROUND OF THE INVENTION

Technical Field

The invention relates to the technical field of wire crimpers, in particular to a wire crimper with a replaceable jaw.

Description of Related Art

A wire crimper is a tool used for crimping wires and terminals. Common telephone wire joints, network cable joints, and wire and equipment joints are all formed by crimping with wire crimpers. Because there are many different types of wires, corresponding wire crimpers need to be used. For electricians, if too many wire crimpers of different types are carried, manpower waste will be caused, and the wire crimpers may be lost. In view of this, the use of a wire crimper with a replaceable jaw is undoubtedly the optimal technical solution.

According to existing wire crimpers with a replaceable jaw, the jaw is arranged at a clamping end of a wire crimper body and is clamped after being positioned. However, after such wire crimpers are used for a period of time, the jaw will be easily bonded or clamped together with the wire crimper body and is difficult to disassemble, and a tool is often used to detach the jaw, which is not only time-consuming and labor-consuming, but also may cause damage to the jaw.

BRIEF SUMMARY OF THE INVENTION

In view of the defects in the prior art, the goal of invention is to provide a wire crimper with a replaceable jaw.

To fulfill the above goal, the invention adopts the following technical solution:

A wire crimper with a replaceable jaw includes a wire crimper body and a jaw. The wire crimper body has an end provided with a handle as well as an end being a clamping end, a recess is formed in an opening of the clamping end, at least one elastic piece is mounted at an inner end of the recess, the jaw is inserted into the recess, and an inner end of the jaw abuts against the elastic piece. A rotatable spindle is arranged in the recess, an end of the spindle is provided with a turncap and located outside the clamping end, a socket is formed in the jaw, a circular hole is formed in a bottom of the socket, a locking piece shaped like an elliptic cylinder is arranged at a position, corresponding to the socket, of the spindle, a minimum diameter of the locking piece is less than a diameter of the socket, and a maximum diameter of the locking piece is greater than the diameter of the socket and less than a diameter of the circular hole.

Preferably, the elastic piece is C-shaped, and a flat surface is arranged at an end, close to the jaw, of the elastic piece.

Preferably, a limiting groove corresponding to the elastic piece in shape is formed in a bottom of the recess, the elastic piece is arranged in the limiting groove, and the end, provided with the flat surface, of the elastic piece is arranged outside the limiting groove.

Preferably, a slot is formed in the limiting groove, and an end, opposite to the end provided with the flat surface, of the elastic piece is inlaid in the slot.

Preferably, the elastic piece is a metal elastic piece.

By adopting the above technical solution, the jaw is directly inserted into the recess, and by rotation of the spindle, the locking piece shaped like an elliptic cylinder on the spindle is allowed to be locked in the circular hole, such that the design requirement for replacement of the jaw is satisfied; moreover, the elastic piece keeps pushing the jaw outwards, such that when the jaw is locked, a fastening force may be provided to prevent the jaw from coming loose, and after being unlocked, the jaw may be directly ejected out, thus facilitating quick replacement of the jaw.

DETAILED DESCRIPTION OF THE INVENTION

To better clarify the purposes, technical solutions and advantages of the invention, the invention is described in further detail below in conjunction with accompanying drawings and embodiments. It should be understood that the specific embodiments described here are merely used for explaining the invention rather than limiting the invention.

In the description of the invention, it should be understood that terms such as "central", "longitudinal". "transverse", "length", "width", "thickness", "upper", "lower", "front", "back", "left", "right". "vertical", "horizontal", "top", "bottom", "inner", "outer", "clockwise" and "anticlockwise" are used to indicate directional or positional relations based on the accompanying drawings merely for the purpose of facilitating and simplifying the description of the invention, do not indicate or imply that devices or elements referred to must be in a specific direction or be configured and operated in a specific direction, and thus should not be construed as limitations of the invention. In addition, terms "first" and "second" are merely for the purpose of description and should not be construed as indicating or implying relative importance or implicitly indicate the number of technical features referred to. Therefore, a feature defined by "first" or "second" may explicitly or implicitly indicate the inclusion of one or more said feature. In the description of the invention, "multiple" refers to two mor more, unless otherwise expressly and specifically defined.

In the description of the invention, it should be noted that unless otherwise expressly stated and defined, terms "mount", "link" and "connect" should be understood in a broad sense. For example, "connect" may refer to fixed connection, detachable connection or integrated connection; mechanical connection or electrical connection; direction connection, indirect connection by means of an intermediate medium, or internal connection or interaction of two elements. Those ordinarily skilled in the art may appreciate the specific meanings of these terms in the invention as the case may be.

Figure 1:
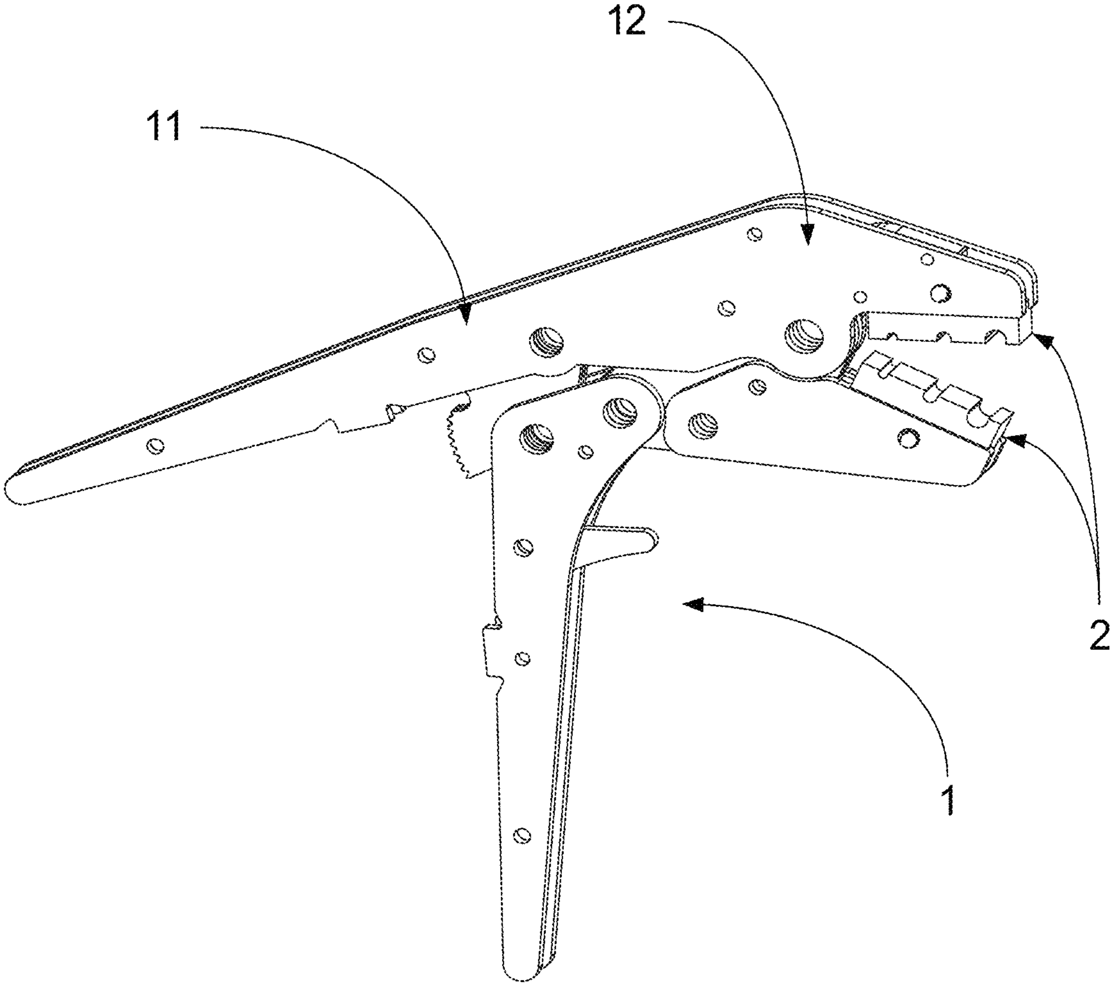
FIG. 1 is a schematic structural diagram according to one embodiment of the invention.
Figure 2:
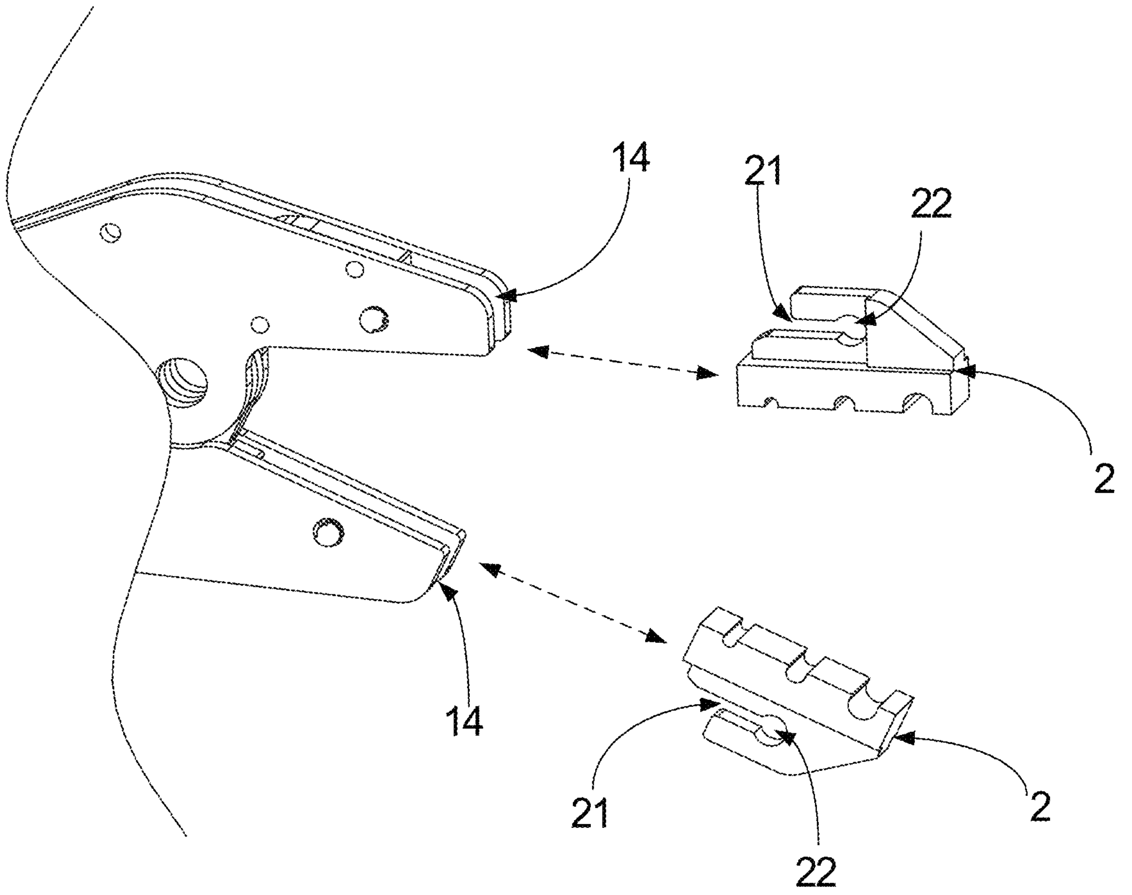
FIG. 2 is a schematic structural diagram of a clamping end according to one embodiment of the invention.
Figure 3:
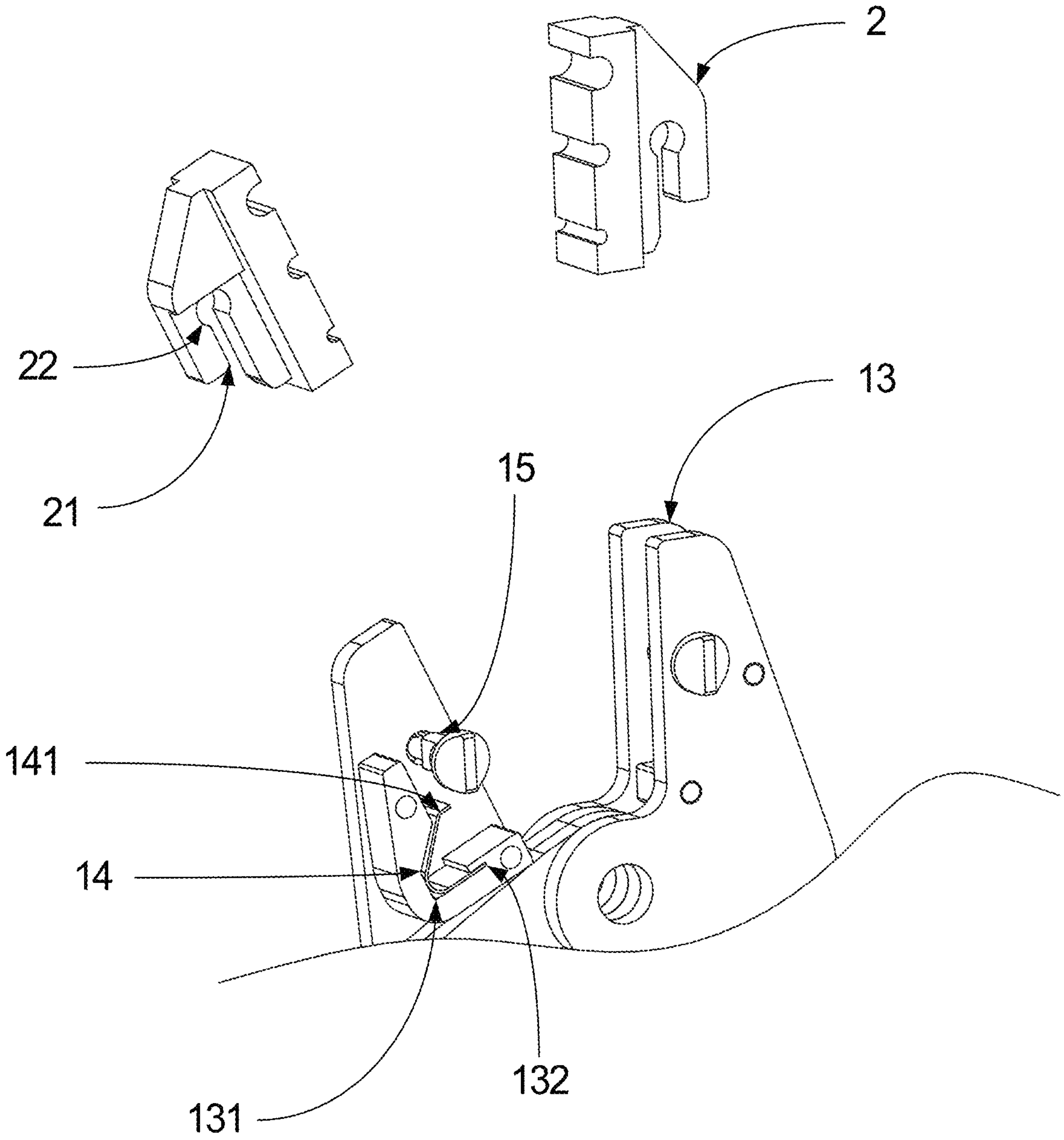
FIG. 3 is a schematic structural diagram of a recess according to one embodiment of the invention.
Figure 4:
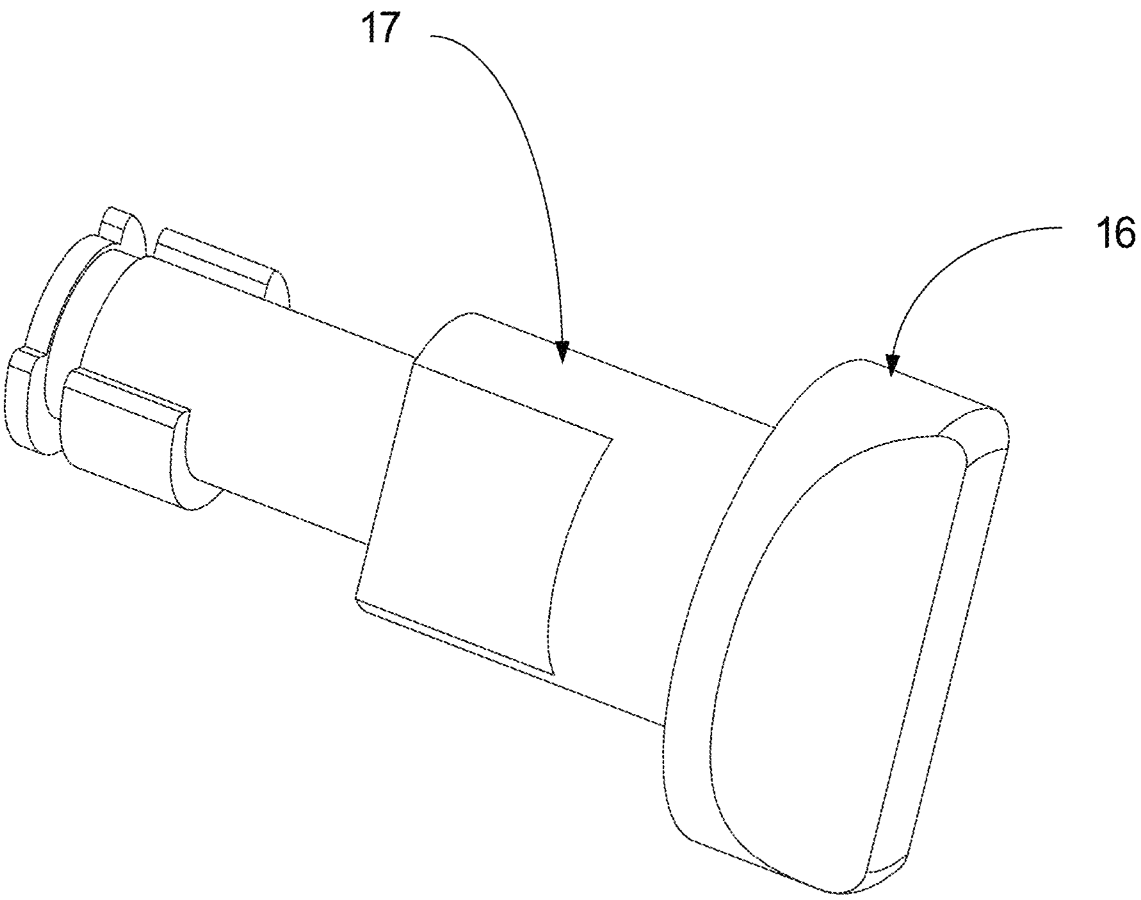
FIG. 4 is a schematic structural diagram of a spindle according to one embodiment of the invention.

As shown in FIGS. 1-3, this embodiment provides a wire crimper with a replaceable jaw, including a wire crimper body 1 and a jaw 2. One end of the wire crimper body 1 is provided with a handle 11, and the other end of the wire crimper body 1 is a clamping end 12. A recess 13 is formed in an opening of the clamping end 12, at least one elastic piece 14 is mounted at an inner end of the recess 13, the elastic piece 14 is a metal elastic piece, the jaw 2 is inserted into the recess 13, and an inner end of the jaw 2 abuts against the elastic piece 14. A rotatable spindle 15 is arranged in the recess 13, one end of the spindle 15 is provided with a turncap 16 and located outside the clamping end 12, a socket 21 is formed in the jaw 2, and a circular hole 22 is formed in the bottom of the socket 21. A locking piece 17 shaped like an elliptic cylinder is arranged at a position, corresponding to the socket 21, of the spindle 15, a minimum diameter of the locking piece 17 is less than a diameter of the socket 21, and a maximum diameter of the locking piece 17 is greater than the diameter of the socket 21 and less than a diameter of the circular hole 22.

In this embodiment, the jaw 2 is directly inserted into the recess 13, and by rotation of the spindle 15, the locking piece 17 shaped like an elliptic cylinder on the spindle 15 is allowed to be locked in the circular hole 22, such that the design requirement for replacement of the jaw 2 is satisfied; moreover, the elastic piece 15 keeps pushing the jaw 2 outwards, such that when the jaw 2 is locked, a fastening force may be provided to prevent the jaw 2 from coming loose, and after being unlocked, the jaw 2 may be directly ejected out, thus facilitating quick replacement of the jaw 2.

In specific operation, when the jaw 2 needs to be installed, the jaw 2 is selected, then the inner end of the jaw 2 is inserted along the recess 13, and a minimum-diameter surface of the locking piece 17 corresponds to the socket 21 to ensure that the socket 21 and the locking piece 17 are smoothly connected. When the inner end of the jaw 2 is inserted to the innermost position, the elastic piece 14 will be compressed, and the locking piece 17 exactly enters the circular hole 22; then, an external force is applied to the turncap 16 to drive the spindle 15 to rotate, the locking piece 17 rotates in the circular hole 22 at the same time until a maximum-diameter surface of the locking piece 17 corresponds to the socket 21, and at this moment, the locking piece 17 will not disengage from the socket 21 and is attached to an inner wall of the circular hole 22 under the action of an elastic force of the elastic piece 17, such that installation of the jaw 2 is completed. When the jaw 2 needs to be replaced with another jaw 2 (different jaws 2 are different merely in the crimping surface for crimping wires and are the same in other portions), an external force is applied to the turncap 16 to drive the spindle 15 to rotate generally by 90°, at this moment, the minimum-diameter surface of the locking piece 17 corresponds to the socket 21, the jaw 2 will be ejected out under the action of the elastic force of the elastic piece 14 and may be directly grabbed, and the desired jaw 2 is installed according to the installation steps of the jaw 2. In this way, the overall installation is extremely easy and convenient.

Further, as for the shape of the elastic piece 14, in this embodiment, the elastic piece 14 is C-shaped, and a flat surface 141 is arranged at an end, close to the jaw 2, of the elastic piece 14. The design of the flat surface allows for better contact between the elastic piece and the inner end of the jaw 2, thus guaranteeing full contact.

Further, to prevent the elastic piece 14 from disengaging from the recess 13 in the deformation process, in this embodiment, a limiting groove 131 corresponding to the elastic piece 14 in shape is formed in the bottom of the recess 13, the elastic piece 14 is arranged in the limiting groove 131, and the end, provided with the flat surface 141, of the elastic piece 14 is arranged outside the limiting groove 131. In this way, the elastic piece 14 is limited by the limiting groove 131. To ensure that the elastic piece 14 will not disengage from the recess 13, a slot 132 is formed in the limiting groove 131, and an end, opposite to the end provided with the flat surface 141, of the elastic piece 14 is inlaid in the slot 132, such that the installation stability of the elastic piece 14 is guaranteed.

The above embodiments are merely preferred ones of the invention and are not intended to limit the patent scope of the invention. All equivalent structural or flow transformations made based on the contents in the specification and drawings, or direct or indirect applications to other related technical fields should also fall within the patent protection scope of the invention.

What is claimed is:

1. A wire crimper with a replaceable jaw, comprising a wire crimper body and a jaw, wherein the wire crimper body has an end provided with a handle as well as an end being a clamping end, a recess is formed in an opening of the clamping end, at least one elastic piece is mounted at an inner end of the recess, the jaw is inserted into the recess, an inner end of the jaw abuts against the elastic piece, a rotatable spindle is arranged in the recess, an end of the spindle is provided with a turncap and located outside the clamping end, a socket is formed in the jaw, a circular hole is formed in a bottom of the socket, a locking piece shaped like an elliptic cylinder is arranged at a position, corresponding to the socket, of the spindle, a minimum diameter of the locking piece is less than a diameter of the socket, and a maximum diameter of the locking piece is greater than the diameter of the socket and less than a diameter of the circular hole;

Wherein the elastic piece is C-shaped, and a flat surface of the elastic piece is arranged at the inner end of the jaw;

wherein a limiting groove corresponding to the elastic piece in shape is formed in a bottom of the recess, the elastic piece is arranged in the limiting groove, and the inner end of the jaw, provided with the flat surface, of the elastic piece is arranged outside the limiting groove.

2. The wire crimper with a replaceable jaw according to claim 1, wherein a slot is formed in the limiting groove, and second end, opposite to the inner end of the jaw provided with the flat surface, of the elastic piece is inlaid in the slot.

3. The wire crimper with a replaceable jaw according to claim 2, wherein the elastic piece is a metal elastic piece.

* * * * *